United States Patent [19]
Guthrie

[11] Patent Number: 5,390,961
[45] Date of Patent: Feb. 21, 1995

[54] DUAL WALL THERMALLY INSULATED CONDUIT INCLUDING SKIN EFFECT HEAT TRACING PIPES

[75] Inventor: Thomas K. Guthrie, New Braunfels, Tex.

[73] Assignee: Thermon Manufacturing Company, San Marcos, Tex.

[21] Appl. No.: 54,895

[22] Filed: Apr. 28, 1993

[51] Int. Cl.[6] .......................... F16L 59/16; F16L 53/00
[52] U.S. Cl. ........................................ 285/41; 285/47; 285/286; 138/33; 392/469
[58] Field of Search ................ 285/41, 47, 286; 138/33; 219/535; 165/164, 180, 181, 183, 184; 392/468, 469

[56] References Cited

U.S. PATENT DOCUMENTS

| | | | |
|---|---|---|---|
| 3,377,463 | 4/1968 | Rolfes | 392/468 |
| 3,377,464 | 4/1968 | Rolfes | 392/468 |
| 3,398,262 | 8/1968 | Kahn | 392/468 |
| 3,407,835 | 10/1968 | Rolfes | 392/468 |
| 3,617,699 | 11/1971 | Othmer | 392/469 |
| 3,693,665 | 9/1972 | Veerling et al. | 285/47 |
| 3,706,872 | 12/1972 | Trabilgy | 392/469 |
| 3,971,416 | 7/1976 | Johnson | 138/33 |
| 4,472,621 | 9/1984 | Blackmore | 138/33 |
| 4,650,971 | 3/1987 | Mantecci et al. | 392/469 |
| 4,791,277 | 12/1988 | Montierth et al. | 392/468 |

FOREIGN PATENT DOCUMENTS

| | | | |
|---|---|---|---|
| 1222246 | 2/1971 | United Kingdom | 138/33 |
| 2161565 | 1/1985 | United Kingdom | |
| 8200746 | 3/1982 | WIPO | 138/33 |

OTHER PUBLICATIONS

Electric Heating System for Pipelines . . . Sectracing; Pipe Heating Systems, Inc., pp. 1-8, Apr. 4, 1980.
Moving The Arctic Oil; Mechanical Engineering Nov. 1971 pp. 27-32.
R. Bruschi et al, "Double Pipe Ensures Reliable Insulation of Offshore Pipelines," Journal of Energy Resources Technology, Jun. 1988, pp. 59-67.
Snamprogetti, "New Double Pipe Insulated System (DPIS) Designed by Snamprogetti" Sales Brochure.

*Primary Examiner*—Eric K. Nicholson
*Attorney, Agent, or Firm*—Pravel, Hewitt, Kimball & Krieger

[57] ABSTRACT

A dual wall thermally insulated conduit which is heat traced using skin effect pipes. A plurality of equally spaced skin effect pipes run longitudinally with the conduit and are located adjacent and external to the carrier or process pipe in the annular cavity between the process and sleeve or jacket pipes. Special joint connectors include holes in the yoke portion to allow the skin effect pipes to exit the annular cavity between the process and jacket pipes. A clam shell is fitted over the special joint connector after the pipe section is assembled and the return conductor installed. The cavity inside the clam shell is filled with insulation. Structural insulation is positioned at the ends of the clam shell to provide a smooth transition to the protective concrete weight coating conventionally used with subsea piping. In cases where the material being delivered has a relatively high desired minimum temperature, it is desirable to actually reduce the thickness of the annular cavity between the process and jacket conduits as the temperature differential between the center of the pipe and the pipe section joint is actually reduced to acceptable levels.

9 Claims, 4 Drawing Sheets

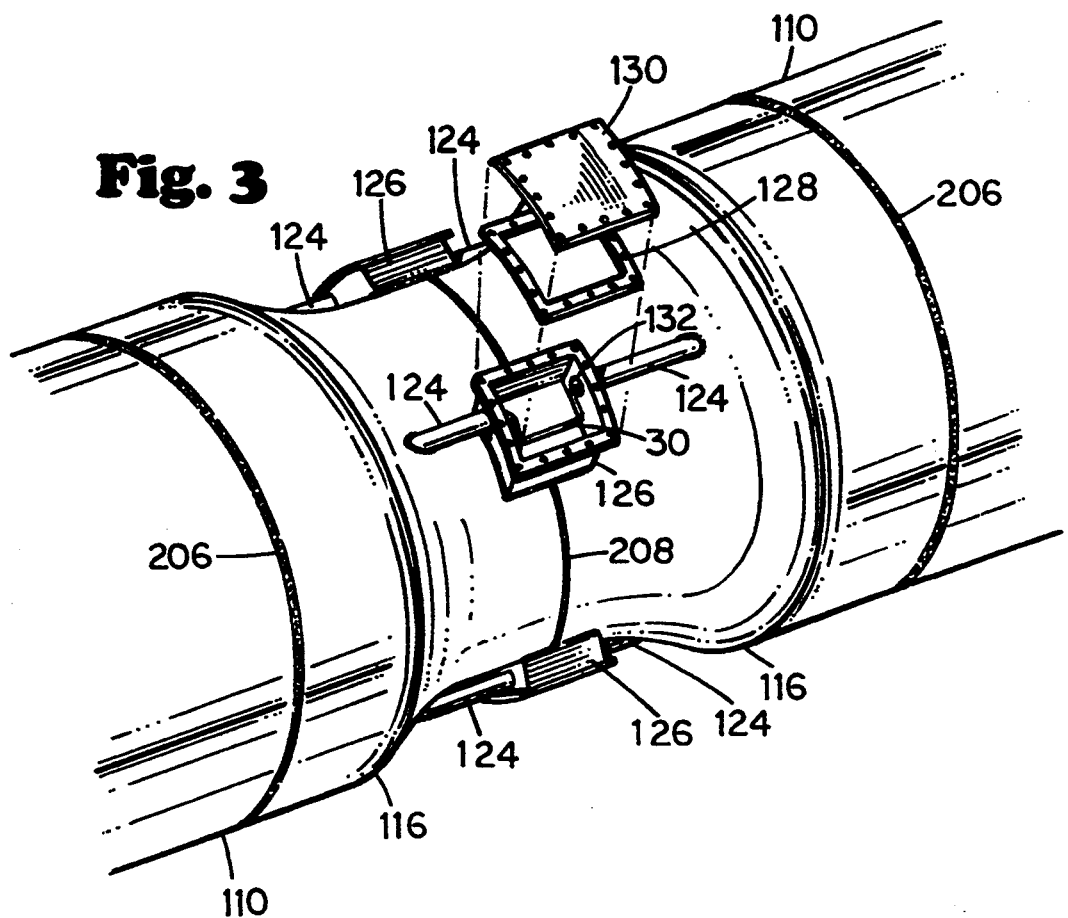
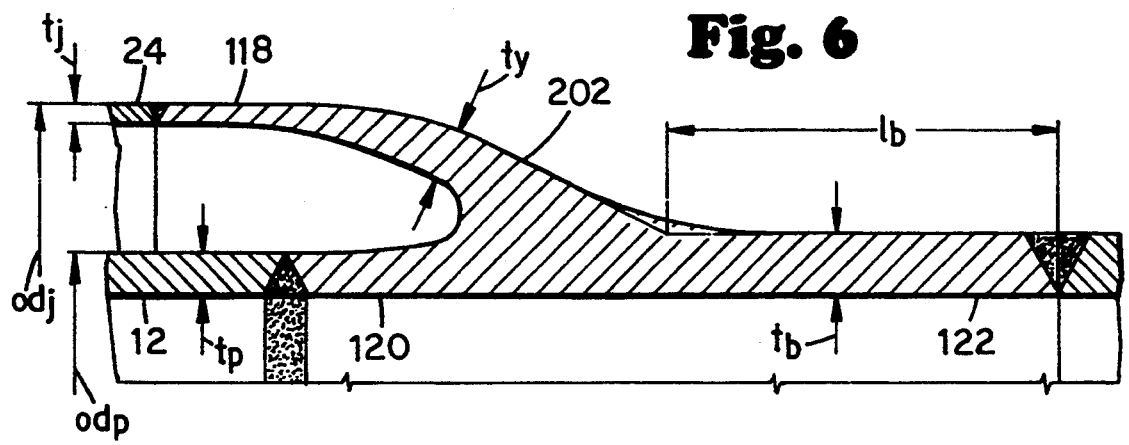

DUAL WALL THERMALLY INSULATED CONDUIT INCLUDING SKIN EFFECT HEAT TRACING PIPES

BACKGROUND OF THE INVENTION

1. Field of the Invention

The invention relates to the combination of double walled, thermally insulated pipes or conduits with skin effect heat tracing pipes.

2. Description of the Related Art

As it is well known, when delivering products such as crude oil having a solidification temperature higher than the ambient temperature and which must therefore be kept at a temperature higher than ambient during delivery and while located in the delivery pipes or conduits, it is necessary to thermally insulate the delivery conduit to help control any heat loss. However, it is also desirable that the insulating properties remain stable for a long period of time. This is particularly difficult in subsea environments or during handling of the conduit.

To this end, a thermally insulated, double wall conduit with special joint connectors to ease installation was developed. This conduit and joint connectors are described in U.K. Patent No. 2,161,565, which is hereby incorporated by reference, and which are called the Double Pipe Insulated System (DPIS) available from Snamprogetti, Milan, Italy.

While the DPIS conduit alone is adequate in many situations, there are also cases where heat must be provided to the material being delivered to keep it sufficiently fluid to allow easy delivery. This heat generation is done in conventional conduit systems using some form of heat tracing. Alternatives include elongated tape heaters, but in many pipeline environments the use of skin effect heat tracing pipes is preferred. In a skin effect heat tracing pipe, the inner surface of a ferromagnetic pipe is electrically energized. An insulated, non-ferromagnetic return conductor is used to complete the circuit. Because of the characteristics of skin effect:, the inner surface of the pipe is energized and heats up but the outer surface is at ground potential. Further examples of skin effect heating are provided in U.S. Pat. Nos. 3,293,407 and 4,645,906, both of which are hereby incorporated by reference.

Conventionally the skin effect pipes are simply in contact with the outer surface of the delivery conduit and thermal conduction is used to transfer the heat from the skin effect pipe to the delivery conduit to the material. However, this is unacceptable when using conduit such as DPIS, because the intermediate insulation limits the transfer of heat into the central process conduit, just as it limits heat transfer out of the process conduit. But as stated, in some cases it is desirable to provide heat to the process conduit to heat the material being delivered. As noted, the dual wall construction of DPIS conduit interferes with the conventional techniques, so that in these cases DPIS conduit may not be used. Therefore it is desirable to be able to heat trace DPIS conduit, particularly using skin effect pipes.

SUMMARY OF THE PRESENT INVENTION

A design according to the present invention allows DPIS conduit to be effectively heat traced using skin effect pipes. A plurality of skin effect pipes run longitudinally with the DPIS conduit. The skin effect pipes are preferably spaced equally around the conduit. The skin effect pipes are located adjacent and external to the carrier or process pipe in the DPIS conduit, thus being located in the annular cavity between the process and sleeve or jacket pipes. The special joint connectors include holes in the yoke portion to allow the skin effect pipes to exit the annular cavity between the process and jacket pipes and connect externally of the special joint connector. Preferably the connection is made at an openable pull box to allow ease of operations. A clam shell is fitted over the special joint connector after the pipe section is assembled and the return conductor installed. The cavity inside the clam shell is filled with insulation. Structural insulation is positioned at the ends of the clam shell to provide a smooth transition to the protective concrete weight coating conventionally used with subsea piping.

Thus the skin effect pipes can directly contact the process conduit for best heat transfer and yet can easily be connected to allow suitably long runs.

It has been found that in cases where the material being delivered has a relatively high desired minimum temperature, it is desirable to actually reduce the thickness of the annular cavity between the process and jacket conduits. Should the thickness be larger and heat tracing utilized, it has been determined that the temperature differential between the delivery material in the special joint connector and the insulation located in the center of a DPIS conduit section becomes unacceptable, particularly during times when the material being delivered is stagnant, such that heat tracing is not acceptable. If the annular thickness is reduced, heat tracing can be utilized, as the temperature differential is actually reduced to acceptable levels. The basis for this counter-intuitive finding is explained in more detail below.

BRIEF DESCRIPTION OF THE DRAWINGS

A better understanding of the present invention can be obtained when the following detailed description of the preferred embodiment is considered in conjunction with the following drawings, in which:

FIG. 3 is a perspective view of a made up DPIS conduit joint showing pull boxes and skin effect pipes external to the joint according to the present invention;

FIG. 6 is an enlarged, partial view of the yoke area of special joint connector.

DETAILED DESCRIPTION OF THE PREFERRED EMBODIMENT

Figure 1:
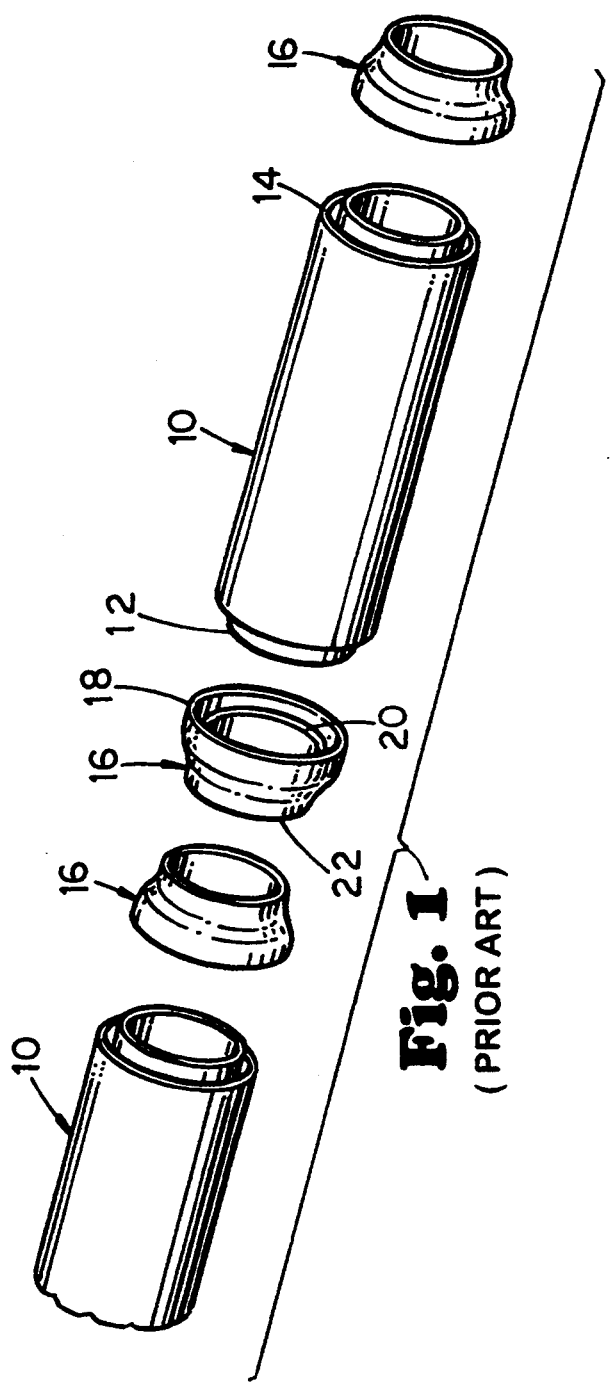
FIG. 1 is an exploded, perspective view of portions of a DPIS conduit according to the prior art.

Referring now to FIG. 1, portions of a DPIS conduit according to the prior art are shown. The conduit includes a straight section 10, with the straight section 100 having an inner carrier or process pipe 12 and an outer sleeve or jacket pipe 14. The space between the two pipes 12 and 14 is conventionally filled with a polyurethane foam of selected thermal conductivity. At each end of the section 10 are located special joint connectors 16. The special joint connectors 16 are generally Y shaped, having a jacket portion 18 adapted to mate with the jacket pipe 14, a process portion 20 adapted to mate with the process pipe 12 and a butt portion 22 adapted to mate with a similar special joint connector 16. By this arrangement the connection between the two special joint connectors 16 can be simply made in the field as only a single weld needs to be reader not a weld of the double wall pipe, as the section 10 is welded to the two special joint connectors 16 at the factory.

Figure 2:
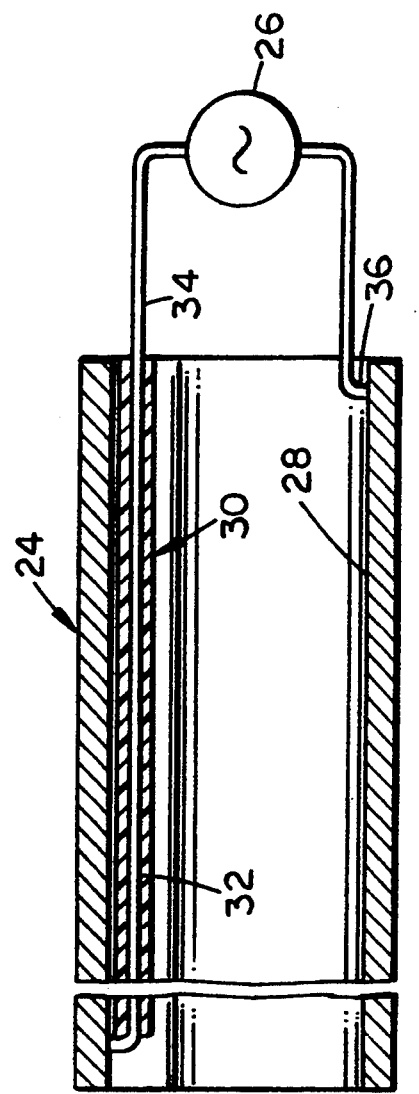
FIG. 2 is a simplified schematic diagram of a skin effect heat tracing pipe according to the prior art.

FIG. 2 which is a very simplified form of a skin effect heating pipe 24 generally according to the prior art, with reference made to the previously indicated patents for further details. The skin effect pipe 24 is preferably formed of a ferromagnetic material. An electrical voltage source 26 has a first terminal connected to the inside surface 28 of the skin effect pipe 24. The skin effect causes energization of the inner surface 28 of the pipe 24, the voltage source 26 preferably being a high frequency source so that only a very small thickness or distance of the inner surface 28 is energized. A return conductor 30 includes an outer insulating portion 32 and an inner non-ferromagnetic electrical conductor portion 34. One end of the return conductor 30 is connected to the voltage source 26. The return conductor 30 traverses the length of the skin effect pipe 24, and at the end opposite the connection 36 with the voltage source 26 the inner conductor 34 is connected to the inner surface 28 of the pipe 24. In this manner the return conductor 30 provides a complete electrical circuit for the voltage source 26. The outer insulating portion 30 is formed of an insulating material sufficient to withstand the desired temperature which will develop in the skin effect pipe 24 and to withstand voltage breakdown at desired operating voltages. A wire of sufficient size is utilized as the inner conductor 34 to reduce the voltage drop in the return conductor 30 to acceptable levels. This example has been illustrative and numerous variations of skin effect pipes maybe utilized.

Proceeding now to FIG. 3, a view of an assembled pipe section according to the present invention is illustrated. Two special joint connectors 116 similar to the special joint connector 16, are shown welded together, with pipe sections 110, similar to section 10, being welded to the special joint connectors 116. A skin effect heat tracing pipe 124 is shown exiting the special joint connector 116 and connecting with an openable pull box 126. The openable pull box 126 is preferably a rectangular box which is welded over the joined location of the special joint connectors 116. The box 126 preferably includes a seal 128 and a cover plate 130 which is fastened by screws, bolts or other fasteners. A second skin effect heat tracing pipe 124 is connected to the box 126 after it has exited the other special joint connector 116. The box 126 contains openings 132 to allow communication between the interior of the skin effect pipes 124 and the interior of the box 126. As shown in FIG. 2, a return conductor 130 is illustrated, with the interior surface of the box 126 being energized and providing the skin effect current path.

Figure 4:
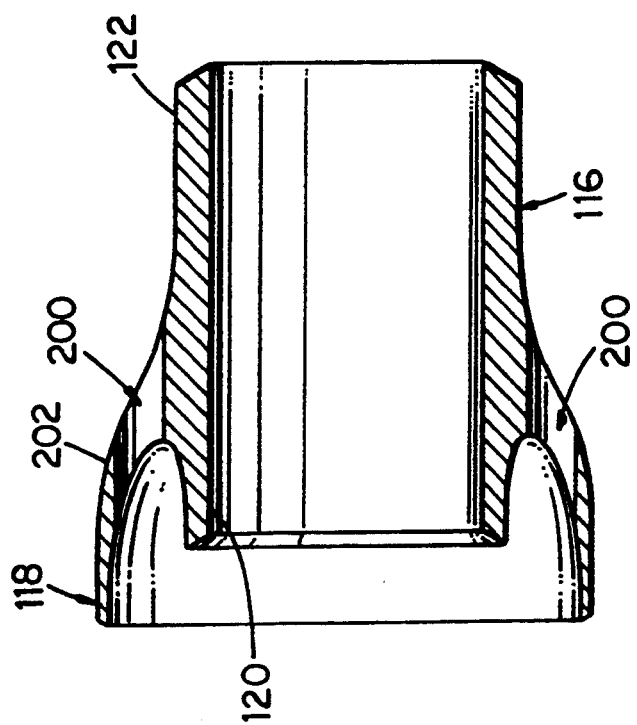
FIG. 4 is a longitudinal cross section of a special joint connector of FIG. 3.
Figure 5:
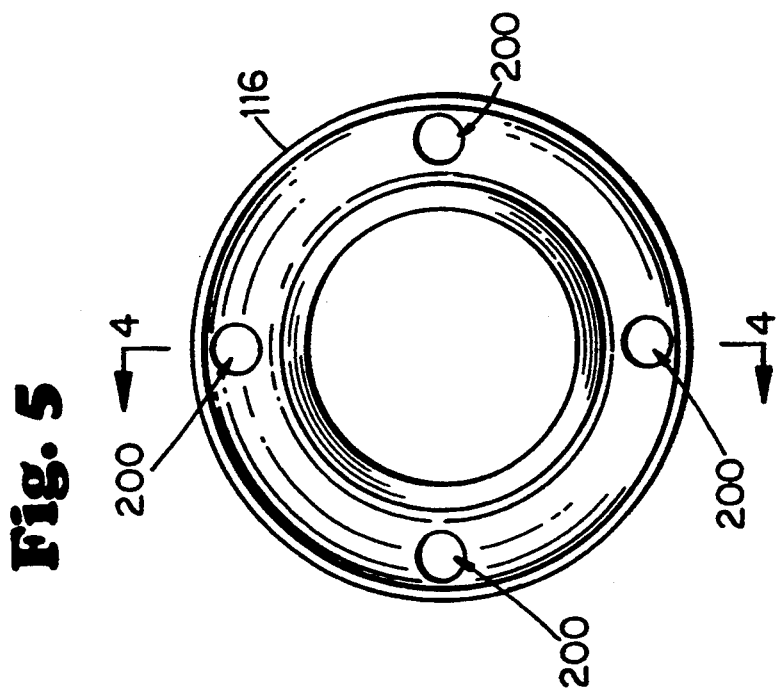
FIG. 5 is an end view of the special joint connector of FIG. 4.

Proceeding now to FIGS. 4 and 5, enlarged views of the special joint connector 116 are shown. As seen from FIG. 5, preferably there are four ports or openings 200 for traversal by the skin effect pipes 124. Preferably the openings 200 are equally spaced radially around the special joint conductor 116. The preferred number of openings 200 is four, but a greater or lesser number could be used if desired depending on the heating requirements and sizing of the skin effect pipes 124. As shown in FIG. 4, the special joint connector 116 contains a butt portion 122, an outer jacket or sleeve portion 118 and an inner process portion 120. A yoke 202 connects the various portions 118, 120 and 122. The thicknesses of the various portions 118, 120, 122 and the yoke 202 profile are developed based on the stresses to be developed while laying of the conduit and while on the sea bottom. The presence of the openings 200 complicates the determination of the thicknesses as compared to a design without the openings 200, but the analysis can still be done using conventional methods known to those skilled in the art. As noted below, the actual thicknesses are relevant to the heat transfer properties and are used to determine the desired distance between the process portion 120 and the jacket portion 118.

Referring now to FIG. 6, the web portion 202 is shown in more detail. The butt portion 122 has a length referred to as $l_b$ and a thickness referred to as $t_b$. The jacket portion 118 has a thickness referred to as $t_j$, with a value $od_j$ being referred to as the outer diameter of the jacket portion 118. A value referred to as $t_p$ is the process portion 120 thickness. The value $od_p$ is the process portion 220 outside diameter. A value $t_y$ is the yoke 202 thickness in the transition portion. As stated above the particular parameters of $t_b$, $l_b$, $t_y$, $t_j$ and $t_p$ are developed based on necessary stresses for given diameter values of $od_j$ and $od_p$. The jacket portion 118 and the jacket pipe 14 are assumed to be of equal thickness and diameter. Similarly, the process portion 120 and the process pipe 12 are assumed to be of equal thickness and diameter. The process pipe 12 outside diameter is generally predetermined based on the material and material flow rates desired. The outer diameter or $od_j$ of the jacket pipe 14 is available in several selectable variations for each particular process pipe diameter $od_p$ and selection of a particular outer diameter is described below.

Figure 7:
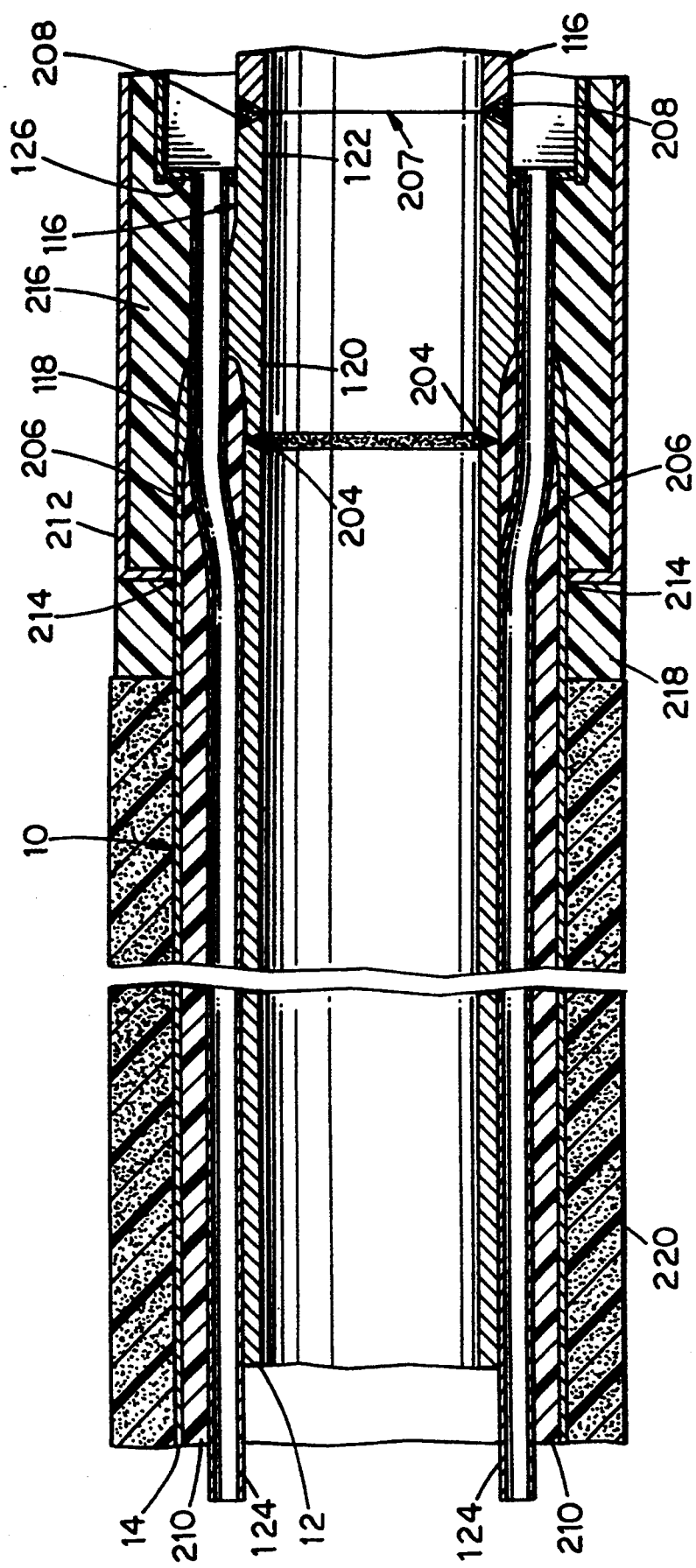
FIG. 7 is a longitudinal, cross sectional view of a heat traced conduit according to the present invention as installed.

FIG. 7 generally illustrates a pipe section as installed. Two special joint connectors 116 are illustrated, a skin effect pipe 124 traversing one special joint connector 116. A special joint connector 116 is welded to the pipe section 10 by welds 204 and 206. The two special joint connectors 116 are shown connected by welds 208. Pull boxes 126 are shown installed on the exterior of the joint 207 between the special joint connectors 116 and receiving the skin effect pipes 124. Insulation 210, preferably a polyurethane foam insulation, is shown located in the annular cavity between the process pipe 12 and the jacket pipe 14. It is noted that the insulation 210 also surrounds the skin effect pipes 124 which are located adjacent the process pipe 12.

A clam shell 212 is located around the special joint connectors 116. The clam shell 212 is generally cylindrical in shape, having flanged ends sized to mate with the outer diameter of the jacket pipe 14. The clam shell 212 is welded to the jacket pipe 14 with welds 214. The interior cavity of the clam shell 212 is filled with insulation 216, preferably a polyurethane foam insulation having selected properties. Located adjacent the clam shell 212 and external to the conduit section 10 is a structural insulation 218. The structural insulation 218 is used to provide a smooth transition from the clam shell 212 to a protective concrete weight jacket 220 applied to the pipe section 10, as conventionally done for subsea piping.

The pipeline can be assembled as follows, but other techniques will be apparent to those skilled in the art.

As a first step the skin effect pipes 124 are welded or attached to the outside of the process pipe 12. The process pipe 12 is then welded by weld 204 to the process portion 120 of a first special joint connector 116. The jacket pipe 14 is then welded to the jacket portion 118 of the special joint connector 116 by weld 206. The next step is the installation of the second special joint connector 116, which is welded to the other end of the pipe section being assembled. At this time the insulation 210 is placed in the gap through a series of access holes, which are then closed, preferably by an injection foam process. This completes one pipe section. The butt portions 122 of two pipe sections 10 are welded together by weld 208 in preparing the pipeline. After the butt weld is completed, the pull boxes 126 are welded to the skin effect pipes 124 and the special joint connector 116. At this time the return conductor 30 is routed through the pipe sections and the pull boxes 126 sealed. The clam shell 212 is next welded over the joint. The final step is that the insulation 216 is placed inside the clam shell 212 through an access hole, which is then sealed. This completes this section of the pipeline and it can now be placed as desired.

Thus a DPIS conduit is shown with skin effect pipes utilized for heat tracing. This allows the use of DPIS conduit in cases where it could not previously be utilized.

Referring again to FIG. 7, the heat transfer locations of interest are as follows. The first characteristic of interest relates to the heat transfer at the center section of the conduit section 10. In this cross section, the material being delivered is located inside the process pipe 12, which in turn is in contact with the skin effect pipe 124, which in turn is surrounded by the insulation 210, which then is bonded to the jacket 14, with the concrete weight jacket 220 forming the final layer. Therefore heat being transferred from the materials being delivered to the environment must traverse this path. Of most interest is the insulation 210, which greatly limits the heat transfer.

The second location of interest are heat transfer paths from the butt portion 122 and the process portion 120, axially along the yoke 202 to the jacket portion 118 and then to the clam shell 212. It is noted that in these paths the highly conductive metal pipe forms a thermal bridge through the insulation 210, thereby forming a large source of heat loss, particularly as the thickness $t_y$ of the yoke 202 increases.

It has been found that in certain particular cases where the material being transported has a relatively high minimum temperature, the diameter of the jacket 14 should not necessarily be as large as possible so that more insulation 210 is present to provide heat loss in the section 10. It has been determined in those particular cases that if the annular cavity is too large, the temperature gradient or temperature difference from the center of the conduit 10 to the joint 207 is too large, as the center section insulates effectively too well and the heat loss at the joint 207 is too large. While the temperature at the joint 207 could be set at any desired level, an upper limit is present because of the insulation 210. The insulation 210 must be kept below its limiting temperature. Thus the temperatures along the pipe cannot exceed a gradient equal to the insulation limiting temperature less the material desired minimum temperature.

For example, in one particular instance the process pipe 12 had a nominal diameter of 20 inches and the outer jacket pipe 14 had a nominal diameter of 26 inches. The values of the various thickness were $t_b$ 0.805 inches, $t_p$ 0.375 inches, $t_j$ 0.311 inches and $t_y$ 0.591 inches in this particular embodiment. The particular material of interest had to be maintained above 50° C., while the temperature had to remain below 100° C. or the polyurethane foam serving as the insulation 210 would degrade. Thus, this resulted in a 50° C. temperature differential. In the case of this 20 inch/26 inch pipe, specific calculations were made and it was determined that the insulation 210 at center of the pipe section 10 would reach a temperature of 88° C., while the material at the joint 207 would fall to a temperature of approximately 39° C. Thus in this case the center section was adequate, but the joint section was actually too cold for the desired situation. If the center section temperature was raised to 100° C., the joint temperature would rise to approximately 51° C., but this near exact match is unacceptable due to potential calculation errors and insufficient design margin.

However, when the process pipe 12 remained at 20 inches and a jacket pipe 14 having an outer diameter of 24 inches was used, a reduced temperature gradient was developed. The various thickness values were $t_b$ 0.839 inches, $t_j$ 0.25 inches, $t_p$ 0.563 inches and $t_y$ 0.787 inches in this case. It was determined that the insulation 210 temperature at the center of the section 10 was slightly below 87° C. and the delivery material temperature at the joint 207 was approximately 59° C., so that the temperatures were well within the desired temperature range and design margins.

It is also noted that the ends of the clam shell 212 must be sufficiently past the yoke 202 so as not to allow that avenue for heat loss to be a limiting factor. In the 20/24 embodiment above, the clam shell 212 extends 12.8 inches past the weld 206 or 24 inches from the joint 207.

It is noted that reducing the thickness of the annular cavity may require increasing the number of skin effect pipes 124 or using a higher voltage, as this thickness controls the diameter, and hence effective heating area, of the skin effect pipes 124. The logic above might suggest that it would be best to reduce the annular cavity thickness.

Thus it has been determined that reducing the insulation thickness in the annular cavity is actually desirable in many instances when skin effect heat tracing is utilized, as compared to similar conditions when heat tracing is not utilized and a greater insulation thickness is considered more desirable.

Having described the invention above, various modifications of the techniques, procedures, material and equipment will be apparent to those in the art. Various changes in the size, shape, materials, components, circuit elements, wiring connections and contacts, as well as in the details of the illustrated circuitry and construction and method of operation may be made without departing from the spirit of the invention. It is intended that all such variations within the scope and spirit of the appended claims be embraced thereby.

I claim:

1. A method for preparing an insulated, heat traced pipeline for carrying a material, the basic pipe sections comprising two concentrically disposed pipes of different diameter, the inner pipe having a first diameter and the outer pipe having a second diameter which is larger than said first diameter, said inner and outer pipes defining therebetween an annular gap, insulation located in said annular gap and joint connector sections at each end of said inner and outer pipes, said joint connector sections being generally Y-shaped and having an inner portion to mate with said inner pipe, an outer portion to mate with said outer pipe, a butt section for mating with said butt section of another joint connector and a yoke portion joining said inner, outer and butt portions, the heat tracing comprising longitudinal heat tracing means located external and adjacent to said inner pipe in the annular gap and external and adjacent to said butt portion of said joint connector, said heat tracing means providing a predetermined amount of heat, said yoke including holes allowing passage of said heat tracing means, wherein said insulation has a maximum desired temperature and the material has a minimum desired temperature thereby defining a critical temperature gradient, the method comprising the steps of:

- determining the insulation maximum temperature and the material minimum temperature;
- selecting an initial thickness of said annular gap to receive said insulation and predetermined amount of heat provided by the heat tracing means;
- determining the maximum insulation temperature and the minimum material temperature for the given insulation thickness and amount of heat;
- if said determined maximum insulation temperature and minimum material temperature are not both satisfactory, reducing the thickness of said annular gap;
- after reducing the annular gap thickness, repeating the step of determining the maximum insulation temperature and the minimum material temperature for the new annular gap thickness; and
- if said determined maximum insulation temperature and minimum material temperature are both satisfactory, constructing a pipe section having the determined annular gap thickness and heat tracing means heat output.

2. The method of claim 1, wherein said heat tracing means is a plurality of skin effect pipes and said pipes are equally radially spaced around said inner pipe.

3. The method of claim 1, wherein said pipeline further includes clam shells located over each joint between pipe sections and insulation between said clam shell and said pipe section and said step of determining the maximum insulation temperature and the minimum material temperature includes said clam shell and clam shell insulation in said determination.

4. A pipe section for use in a pipeline transporting material, the material having a desired minimum temperature, the pipe section comprising:

- two concentrically disposed pipes of different diameter, the inner pipe having a first diameter and the outer pipe having a second diameter which is larger than said first diameter, said inner and outer pipes defining therebetween an annular gap;
- insulation being located in said annular gap;
- joint connector sections at each end of said pipes, said joint connector sections being generally Y-shaped and having an inner portion to mate with said inner pipe, an outer portion to mate with said outer pipe, a butt section for mating with said butt section of another joint connector and a yoke portion joining said inner, outer and butt portions and including holes; and
- longitudinal heat tracing means located external and adjacent to said inner pipe in the annular gap and external and adjacent to said butt portion of said joint connector, said heat tracing means providing a predetermined amount of heat, said heat tracing means passing through said holes in said yoke,
- wherein said insulation has a maximum desired temperature and the material has a minimum desired temperature thereby defining a critical temperature gradient and wherein the annular gap thickness is reduced from a thickness where the critical temperature gradient is exceeded.

5. The pipe section of claim 4, wherein said heat tracing means comprises skin effect pipes.

6. The pipe section of claim 5, wherein said skin effect pipes are equally radially spaced around said inner pipe.

7. A pipeline for transporting material, the pipeline comprising:

- a plurality of pipe sections, each pipe section including:
  - two concentrically disposed pipes of different diameter, the inner pipe having a first diameter and the outer pipe having a second diameter which is larger than said first diameter, said inner and outer pipes defining therebetween an annular gap;
  - insulation being located in said annular gap;
  - joint connector sections at each end of said pipes, said joint connector sections being generally Y-shaped and having an inner portion to mate with said inner pipe, an outer portion to mate with said outer pipe, a butt section for mating with said butt section of another joint connector and a yoke portion joining said inner, outer and butt portions and including holes; and
  - longitudinal heat tracing means located external and adjacent to said inner pipe in the annular gap and external and adjacent to said butt portion of said joint connector, said heat tracing means providing a predetermined amount of heat, said heat tracing means passing through said holes in said yoke,
  - wherein said insulation has a maximum desired temperature and the material has a minimum desired temperature thereby defining a critical temperature gradient, wherein the annular gap thickness is reduced from a thickness where the critical temperature gradient is exceeded and wherein said pipe sections are joined at said butt portions;
- a plurality of boxes located external and adjacent to the location wherein said pipe sections are joined, said boxes including holes for passing said heat tracing means;
- a plurality of clam shells located and surrounding said pipe sections where said pipe sections are joined, said clam shells having a pipe portion having a diameter greater than the diameter of said outer pipe and end portions connected to said clam shell pipe portion and for connecting to said outer pipe, whereby a cavity is formed between said clam shell and said outer pipe; and
- insulation located in the cavity between said clam shell and said outer pipe.

8. The pipeline of claim 7, wherein said heat tracing means comprises skin effect pipes.

9. The pipe section of claim 8, wherein said skin effect pipes are equally radially spaced around said inner pipe.

* * * * *